Oct. 10, 1967  F. W. YUNT ETAL  3,345,889
SLIDE AND GRIP QUICK-ACTION CAM-LOCK CLAMP
Filed May 18, 1965  2 Sheets-Sheet 1

INVENTORS
Fred W. Yunt
H. Keats Baker

By Harold L. Fox
AGENT

INVENTORS
Fred W. Yunt
H. Keats Baker

By Harold L. Fox
AGENT

United States Patent Office 3,345,889
Patented Oct. 10, 1967

3,345,889
SLIDE AND GRIP QUICK-ACTION CAM-LOCK CLAMP
Fred W. Yunt, Torrance, and H. Keats Baker, Fullerton, Calif., assignors to Northrop Corporation, Beverly Hills, Calif., a corporation of California
Filed May 18, 1965, Ser. No. 456,661
3 Claims. (Cl. 77—63)

ABSTRACT OF THE DISCLOSURE

A tool, adapted to be slidably mounted on the vertical column of a drill press or like machine, functioning to releasably secure a component on the work table of the drill press. The tool includes manually operable cam element whereby pressure may be applied to the component and extendable finger means enabling the overall length of the tool to be increased or decreased.

---

This invention relates to clamping devices and more particularly to a clamping device adapted to assure and maintain a firm relation between a work-piece and the drill bit of a drill press.

In effecting a drilling operation difficulty is frequently experienced in maintaining a specific relationship between the drill (bit) and work-piece. The foregoing is especially true if the subject work-piece is relatively small or the number of pieces to be fabricated does not warrant the construction of a holding fixture. A special fixture is normally constructed for production runs and is quite satisfactory from this standpoint, however, it is uneconomical if only a few pieces are to be fabricated. Accordingly it becomes apparent that some economical means must be provided to maintain a specific relation between the working tool of a machine tool and a work-piece in cases where only one or at most only a few pieces are to be fabricated.

An object of the present invention is to provide a clamping device usable with a machine tool having a vertical column and functioning to maintain a fixed relation between a work-piece and the working component of the subject tool and incorporating means whereby the length of the device may be easily and readily increased or decreased.

Another object is to provide a clamping device usable with a machine tool having a vertical column and functioning to maintain a fixed relation between a work-piece and the working component of the subject tool and incorporating camming means adapted to urge the device into a firm relation with respect to the work-piece.

Another object is to provide a clamping device usable with a machine tool having a vertical column which provides a plurality of functions, that is simple in design yet rugged in construction, is economical to manufacture, and is easily adapted to the purposes for which it is intended.

Although the characteristic features of the present invention are particularly pointed out in the appended claims, the invention itself, also the manner in which it may be carried out, will be better understood by referring to the following description taken in connection with the accompanying drawings forming a part of this application and in which:

Figures 1, 2:
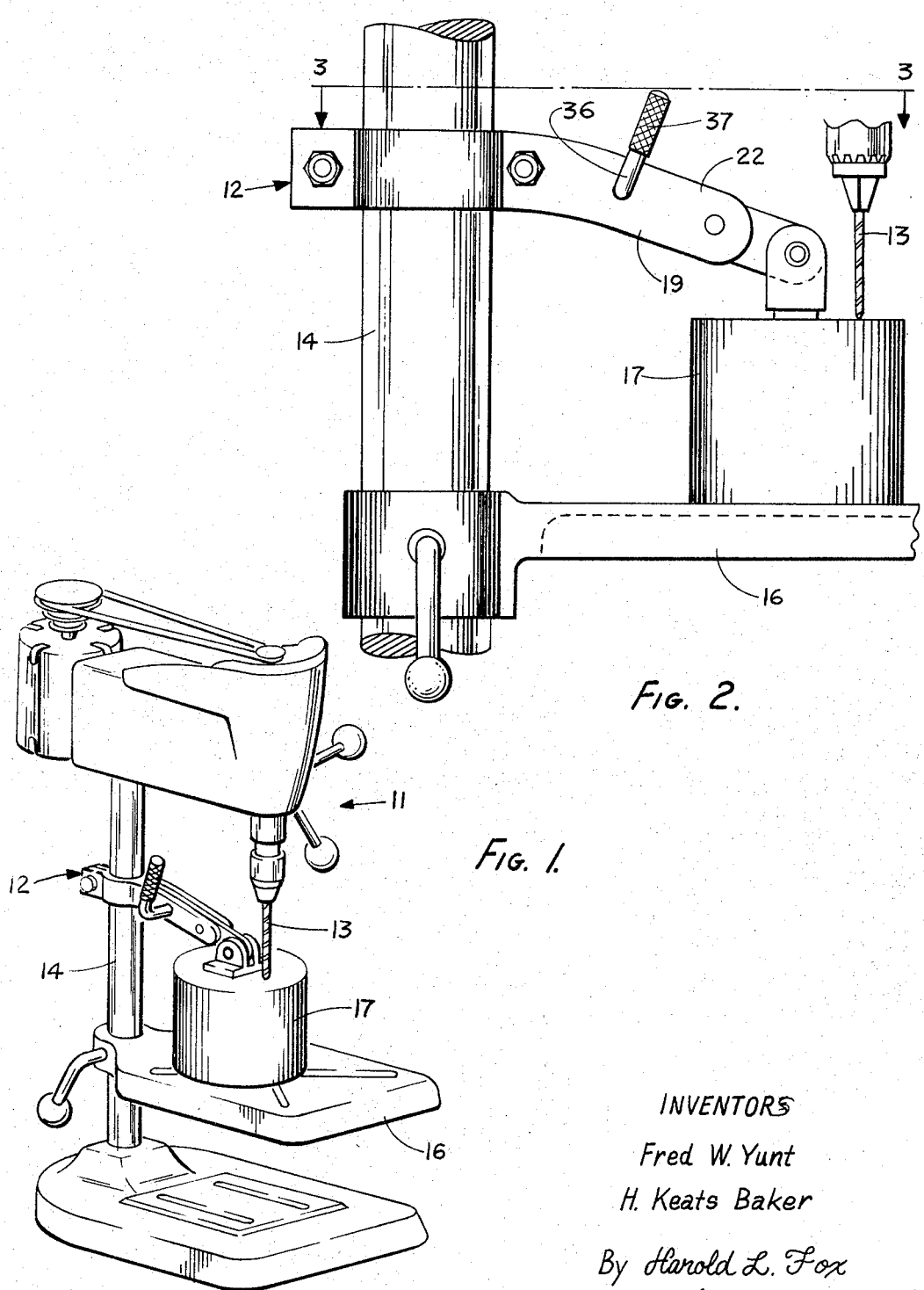
FIGURE 1 is a perspective view of a column type drill press embodying a clamping device as disclosed herein.
FIGURE 2 is a fragmentary view of the drill press of FIGURE 1 showing in detail construction of the subject clamping device.

Referring to the drawings, FIGURE 1 illustrates a pedestal type drill press 11 having a clamping device 12 as disclosed herein. The drill press 11 includes a vertical column 14 and a horizontally disposed work table 16 having a work-piece 17 positioned thereon and the press embodying a bit B. The device 12 functions to maintain the work-piece 17 in a fixed position relative to the bit B except for vertical movement of the latter.

Figure 3:
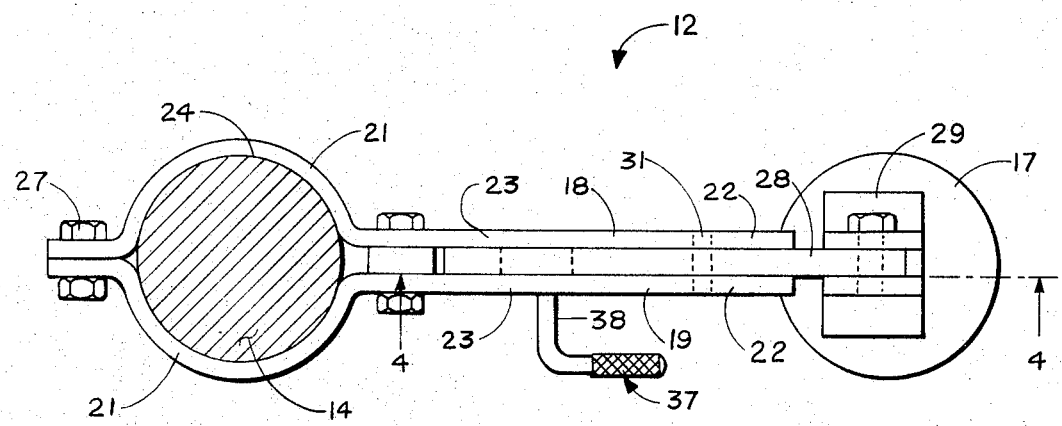
FIGURE 3 is a view of the clamping device of FIGURE 2 as indicated by the arrows 3—3 of FIGURE 2.
Figure 4:
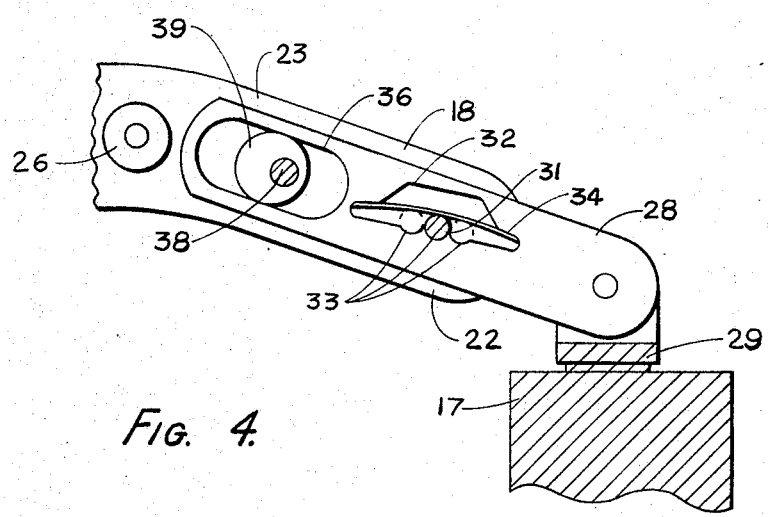
FIGURE 4 is a view of the clamping device of FIGURES 2 and 3 as indicated by the arrows 4—4 of FIGURE 3.

The clamping device 12 includes a pair of members 18 and 19 comprising inboard and outboard end portions 21 and 22, respectively, and intermediate portions 23, in the present embodiment members 18 and 19 are fabricated of strap material. The inboard end portions of the members 18 and 19 are shaped to provide a substantially circular passageway 24 therebetween when in their assembled positions as shown in FIGURE 3. Specifically, the passageway 24 receives the column 14 of the press 11 and provides a sliding fit thereon. Also, in their assembled relation the intermediate and outboard end portions of the members 18 and 19 have a spaced relation and the latter portions are inclined downwardly a slight amount as best seen in FIGURES 2 and 4. This construction imparts a more advantageous position to the end portions 22 adjacent the contact thereof with the work-piece 17, likewise this particular configuration positions the remainder of the device 12 at a desirable position above the work-piece 17.

As mentioned above the intermediate and outboard end portions 23 and 22, respectively, have a spaced relation, this relation is effected by a washer-like spacer 26 positioned between the members 18 and 19. The members 18 and 19 are held together by bolt and nut combinations 27 and when released provide means whereby the members are positioned and subsequently secured in their assembled relation on the column 14.

Pivotally mounted between the members 18 and 19 is a finger member 28 carrying a conventional pad member 29 at its outer end. The member 28 is mounted on and pivots on a pin 31 which in turn is mounted in the outboard ends of the members 18 and 19. The pin 31 is located in a first slot 32, generally of trapezoidal configuration, and having a plurality of circular depressions 33 formed in its lower surface as shown in FIGURE 4. The slot 32 provides means whereby the overall length of the device 12 can be altered, specifically it provides means whereby the member 28 may be moved inboard or outboard as desired. The above mentioned lengthening or shortening of the device 12 is accomplished by moving the member 28 to position the pin 31 in a desired one of the depressions 33. In the present embodiment three depressions are shown formed at the mid-point of the slot 32. The pin 31 is positioned in the center depression 33 shown by solid line construction in FIGURE 4, it will be apparent that the member 28 may be moved to position the pin 31 in either of the outside depressions 33 (dotted line construction). A leaf spring 34 spans the slot 32 and functions to retain the pin 31 in a desired depression 33, also its flexibility allows movement of the member 28 to position the pin 31 in another depression and thereby increases or decreases the overall length of the device 12.

A second slot 36 is provided at the inner end of the member 28, the slot is closed at its ends and its sides have a parallel relation. Mounted in the members 18 and 19 and passing through the slot 36 is camming means 37 including a shaft member 38 having an eccentric member 39 fixedly mounted thereon. The members 18 and 19 provide bearings for the member 38, the member 39 being secured to the member 38 so that it will be located between the members 18 and 19 and, therefore is located in the slot 36 at such time as the components of the device 12 are in their assembled relation. It will be noted that the slot 36 is of sufficient length allowing the member 28 to be moved so that the pin 31 may be positioned in any one of the depressions 33.

It will now be apparent that upon actuation of the cam means 37, the finger means and pad members 28 and 29, respectively, will be urged in a down or up direction within the limits of the throw of the eccentric member 39. Although the passageway 24 provides a sliding fit on the column 14 very little clearance is provided between the members 18 and 19 and the column 14. Accordingly with the pad member 29 positioned on the work-piece 17, it will be apparent that the device 12 will become cocked and accordingly locked on the column 14 in a recognized manner upon actuation of the camming means 37. Accordingly the work-piece will be firmly held with respect to the bit B and both hands of the operators will be rendered free for purposes other than holding the work-piece 17.

Accordingly it is seen that a clamping device capable of accomplishing the various objects as set forth above is disclosed.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

We claim:

1. A clamping device usable in connection with a machine tool having a vertically disposed column member and a horizontally disposed work table, the combination comprising: an elongated member having inboard and outboard end portions; said inboard end portion defining a passageway adapted to be slidably mounted on said column member with the latter received in said passageway and said outboard end portion extending generally normal to said column member; finger means pivotally mounted in and extending beyond said outboard end portion; cam means mounted in said member and finger means whereby the latter may be urged either in upward or downward directions with respect to said member in response to action of said cam means; slot means formed in said finger means and having a plurality of depressions formed therein; pin means mounted in said member and passing through said slot means; and spring means mounted in said slot means functioning to allow said pin means to be positioned in any one of said plurality of depressions whereby the overall length of said member and finger means may be increased or decreased.

2. The combination of a machine tool having a vertically disposed column member and horizontally disposed work table with a clamping device comprising: a pair of elongated strap members having inboard and outboard end portions; said inboard end portion defining a passageway the latter being slidably mounted on said column member with said outboard end portion extending generally normal to said column member and above said work table; finger means pivotally mounted in and extending beyond said outboard end portion; cam means mounted in said member and finger means whereby the latter may be urged either in upward or downward directions with respect to said members in response to action of said cam means; slot means formed in said finger means and having a plurality of depressions formed therein; pin means mounted in said members and passing through said slot means; and spring means mounted in said slot means functioning to retain said pin means in any one of said depressions whereby the overall length of said member and finger means may be increased or decreased.

3. The combination as set forth in claim 2: in which said spring means constitutes a leaf-type spring extending between the ends of said slot and contacting said pin means whereby the latter is normally retained in one of said depressions.

References Cited

UNITED STATES PATENTS

| 2,486,638 | 11/1949 | Eshelman | 77—63.7 |
| 2,613,557 | 10/1952 | Pricer | 77—63.7 |

FRANCIS S. HUSAR, *Primary Examiner.*